Aug. 3, 1971　　　　E. J. STENGLE, JR　　　3,597,298
THERMOFORMED PLASTIC CLOSURE AND METHOD OF MAKING SAME
Filed May 13, 1968　　　　　　　　　　　　3 Sheets-Sheet 1

INVENTOR.
EDWARD J. STENGLE JR.
BY
ATTORNEYS

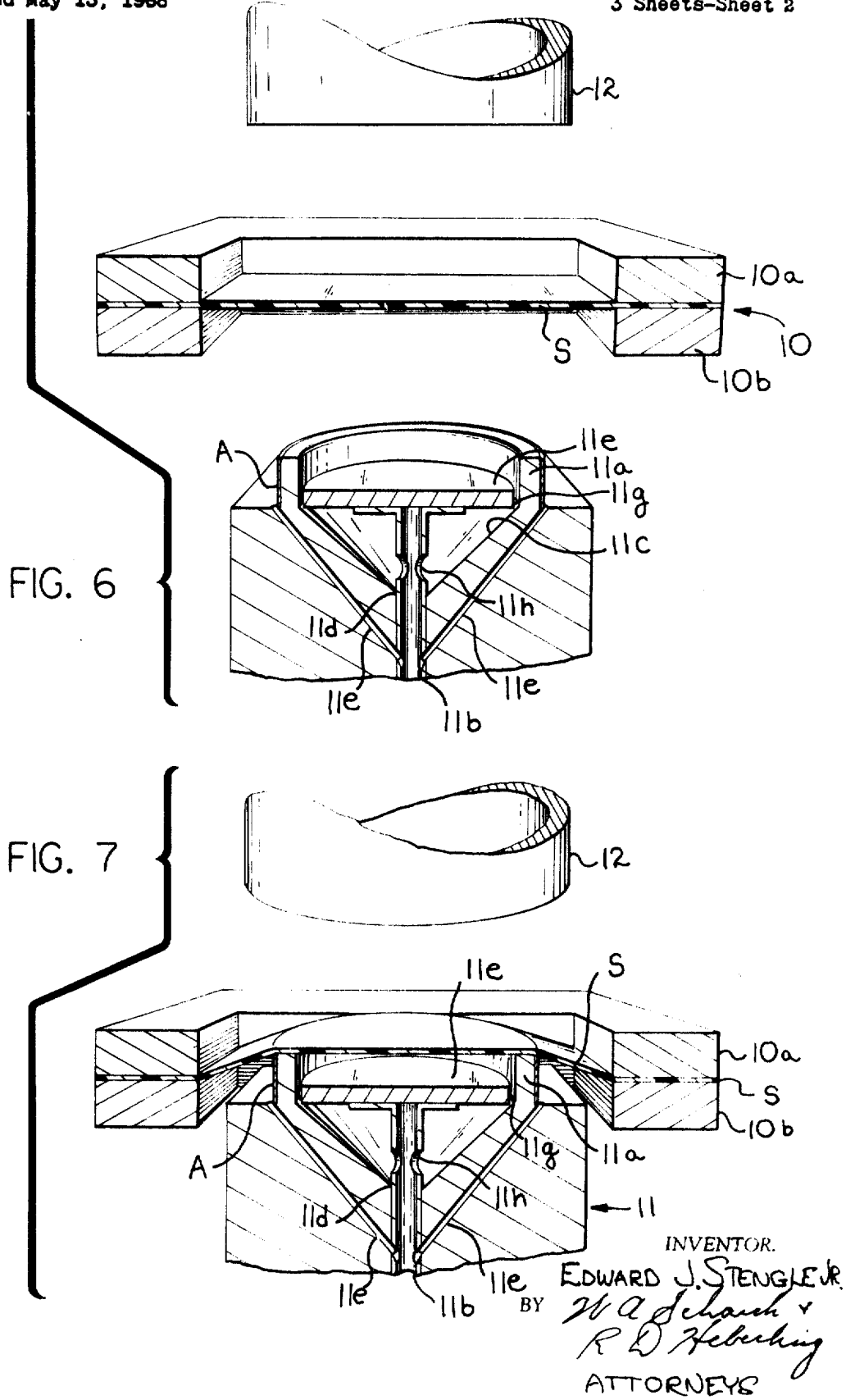

INVENTOR.
EDWARD J. STENGLE JR
BY
ATTORNEYS

United States Patent Office 3,597,298
Patented Aug. 3, 1971

3,597,298
THERMOFORMED PLASTIC CLOSURE AND
METHOD OF MAKING SAME
Edward J. Stengle, Jr., Toledo, Ohio, assignor to
Owens-Illinois, Inc.
Filed May 13, 1968, Ser. No. 728,454
Int. Cl. B37b 1/04
U.S. Cl. 161—42                                13 Claims

ABSTRACT OF THE DISCLOSURE

This invention relates to an improved closure for glass, paper, or plastic containers which can be economically produced by thermoforming operations upon a sheet of thermoplastic material. In accordance with the method of this invention, an annular band or film of an adhesive-forming material is applied to an annular surface of a thermoforming mold. The application of a thermoplastic sheet to the thermoforming mold concurrently results in the formation of the desired closure configuration and the transfer of the annular band of adhesive-forming material to the finished closure.

---

This invention relates to an improved thermoplastic closure and to an economical method of producing such closure by thermoforming operations.

It has long been recognized in the closure art that the most effective seals produced between a thermoplastic closure and a cooperating container, whether the container be formed of glass, metal, paper, or plastic, involves the utilization of an appropriate adhesive between an annular surface on the closure and a cooperating annular sealing surface on the container. The utilization of the appropriate adhesive has heretofore introduced uneconomical manufacturing complications. If the necessary adhesive layer is applied to the container before the filling operation, then it must be protected from contamination that might occur during the filling operation and, if applied after the filling operation, this introduces a manufacturing step which must be performed by the packer, and this is very much contrary to his desires. If, on the other hand, the adhesive layer is applied to the closure, this has heretofore required an additional manufacturing operation which made the resulting closure uneconomical when compared with other types of closures which can be completely produced in a single forming operation.

Accordingly, it is an object of this invention to produce an improved adhesive type thermoplastic closure and an economical method of manufacturing same.

Another object of this invention is to provide an improved process for producing thermoplastic closures by a thermoforming operation characterized by the incorporation of a desired annular adhesive layer in the closure during the thermoforming operation.

Other objects and advantages of this invention will become apparent to those skilled in the art by reference to the following detailed description and the annexed sheets of drawings on which, by way of preferred example only, are illustrated several embodiments of this invention.

On the drawings:

FIGS. 1 through 5 respectively constitute schematic vertical sectional views of a plurality of thermoformed closure designs incorporating this invention and produced in accordance with the method of this invention.

Figure 5:
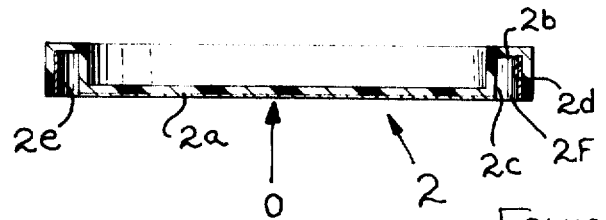

FIGS. 6, 7, 8 and 9 respectively constitute schematic sectional perspective views of the various steps of a thermoforming operation utilized to produce a closure of the general design shown in FIG. 5.

Figure 10:
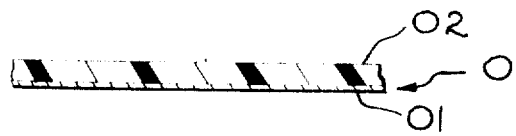

FIG. 10 is an enlarged scale sectional view of the reinforcing disc incorporated in the modification of FIG. 5.

Figure 1:
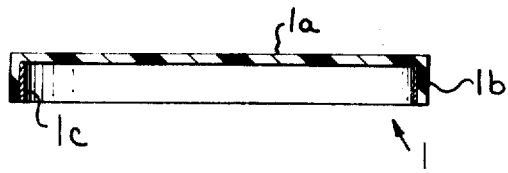

As shown on the drawings:

As will be recognized by those skilled in the art, if it is possible to economically incorporate an annular layer of an adhesive or an adhesive-forming material in a finished closure, then the resulting closure can be made in any one of a number of configurations, depending upon the desired location of the cooperating annular sealing surface on the container to which the closure is to be applied. Referring to FIG. 1, there is shown a closure 1 embodying this invention of simple inverted cup-shaped configuration having a circular panel portion 1a and a depending annular side wall portion 1b. Adhered to the internal annular surfaces of side wall 1b is a layer of adhesive-forming material 1c. Such material is preferably not tacky in its normal condition but has the property of being convertible to an adhesive through the application of heat. While a number of these types of materials are available in the art, the particular adhesive layer 1c to be employed in any particular closure application must be selected by taking into account first, the thermoplastic material from which the closure 1 is formed, secondly, the material from which the cooperating annular sealing surface (not shown) of the container is formed, and lastly, the temperature and pressure conditions encountered in forming the closure. A more detailed discussion of appropriate materials will be set forth later.

Figure 2:
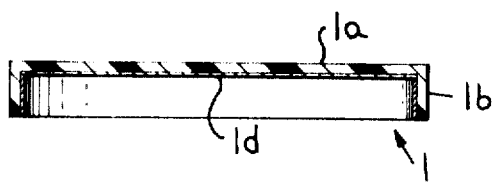
Figure 3:

The closure of FIG. 1 may be improved in the manner indicated in FIG. 2 to provide either additional panel strength and/or barrier resistance to transmission of gases through the closure by the incorporation of a circular disc 1d of aluminum or tin foil or a lamination of metal foil and an appropriate adhesive-forming plastic, in contiguous relationship to the interior surface of the panel portion 1a. The adhesive-forming thermoplastic material may be applied to opposite sides of a metal foil (preferably aluminum) to form a sandwich, if desired.

Each of the closure configurations shown in FIGS. 1 and 2 are designed to cooperate with containers having an external cylindrical sealing surface. In the event it is desired to provide a closure for a container having a horizontal annular sealing surface, such as the annular end face of a glass container, then the closure construction of FIG. 3 may be employed. In this construction, the closure 1 has the same configuration as heretofore described, but the annular adhesive-forming layer 1e is applied to the peripheral portions of the inner surface of the panel portion 1a of the closure 1.

Figure 4:

If a plug-type closure is desired, then either of the constructions of FIGS. 4 or 5 may be employed. Plug-type closure 2 comprises a circular disc panel portion 2a which has an integral peripheral U-shaped cross section flange portion 2b. Flange portion 2b thus provides one generally cylindrical externally-facing wall 2c and, spaced outwardly therefrom, a second inwardly-facing generally cylindrical wall 2d. The space 2f between the walls 2c and 2d is normally proportioned to snugly receive the rim portion (not shown) of the container to which the closure is to be applied. In the modification of FIG. 4, an annular layer of adhesive-forming material 2e is applied to the outwardly-facing cylindrical surface 2c, while in the modification of FIG. 5, the layer of adhesive-forming material 2e is applied to the inwardly-facing cylindrical surface 2d. In either event, the resulting closure may be inserted within the rim or mouth portion of an appropriate container and an adhesive seal made between such closure and the rim portion through suitable activation of the adhesive-forming layer 2e by heat and/or pressure. Additionally a disc O of aluminum or tin foil, a laminate of metal foil and an adhesive-forming plastic, or a sandwich (in which a metal foil is located between layers of the adhesive-forming thermoplastic) may be incorporated in the closure of FIG. 5 to improve its barrier resistance to gases and its lateral stiffness.

Referring now to FIGS. 6 through 9, there is schematically disclosed the various steps involved in producing a closure in accordance with this invention. Referring particularly to FIG. 6, there are schematically shown three elements of a common thermoforming apparatus capable of producing a closure of the general configuration shown in FIG. 5. Such apparatus comprises a plastic sheet-holding frame 10, including upper frame element 10a and similarly-shaped lower frame element 10b, which may be relatively vertically actuated to grasp between such frame elements, portions of a heated thermoplastic sheet S. Beneath the frame 10 there is provided a male thermoforming mold 11 having a configuration generally corresponding ot the desired internal surfaces of the desired closure. Thus, mold 11 is provided with an upstanding annular rim portion 11a which is proportioned to produce the annular U-shaped rim portion 2b of the closure of FIG. 5. While the annular rim portion 11a is schematically disclosed as being solid, those skilled in the art will understand that it should be provided with conventional fluid passages (not shown) to permit this portion of the mold to be cooled to a desired temperature during the molding operations. Additionally, mold 11 is provided with an axial opening 11b, conically counterbored at its top end as shown at 11c, which receives a support pipe 11d, on the top of which is mounted a molding disc 11e which defines the central panel portion 2a of the desired closure. The bore of pipe 11d is connected to a suitable vacuum source (not shown) and a plurality of drilled holes (not shown) communicate between such bore and the outer corner of the annular rim portion 11a. Additionally, an annular space 11g is provided between the mold disc portion 11e and the annular rim portion 11a, and this space is connected to the vacuum source by holes 11h in pipe 11d.

Lastly, a shaping ring 12 is provided above the sheet grasping forms 10, such ring being proportioned to cooperate with the upstanding annular rim 11a to define a space therebetween for forming the external annular flange of the desired closure.

Figure 8:
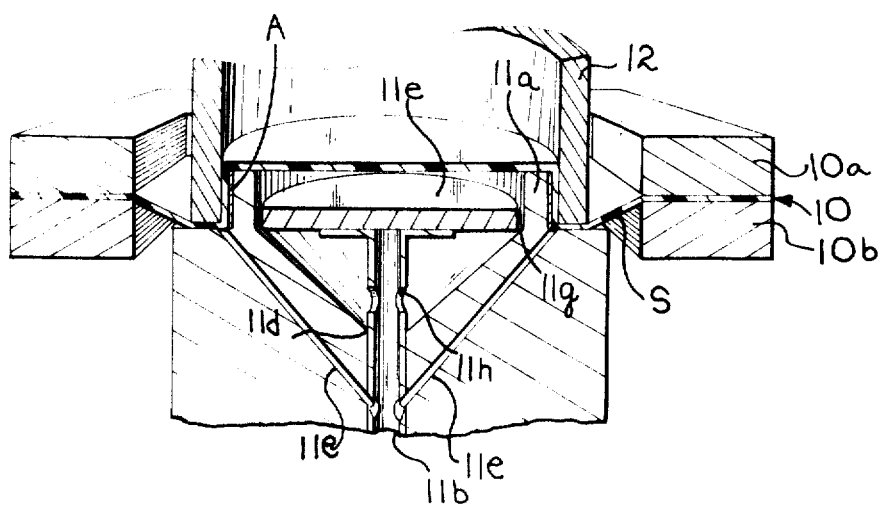
Figure 9:
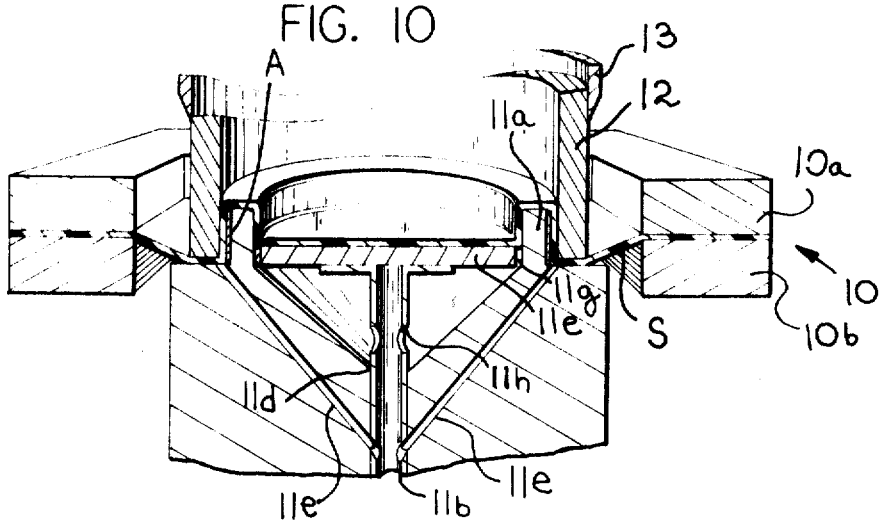

The sequence of operations in accordance with the invention is successively illustrated in FIGS. 6 through 9. Assuming that the thermoplastic sheet S is heated to a forming temperature, a portion of such sheet is grasped by the frame 10 and then, as illustrated in FIG. 7, the forming mold 11 is raised vertically relative to the frame 10 to bring the annular rim 11a of such mold into contact with the heated sheet S. Immediately thereafter, as illustrated in FIG. 8, the molding ring 12 is lowered relative to the sheet frame 10, and this effects the stretching and forming of the sheet S around the outer surfaces of the annular molding rim 11a. Lastly, as illustrated in FIG. 9, vacuum is applied through the bore of pipe 11d, and the resulting pressure differential causes the central portion of the engaged sheet to be drawn into conformity with the disc portion 11e of the mold. If desired, an annular cutter 13 may then be slid down the exterior of mold ring 12 to effect the cutting of the forming closure from the sheet. Alternatively, this operation could be accomplished at another station.

The thermoforming operations thus far described will be recognized by those skilled in the art to be entirely conventional; however, in accordance with this invention, one new step is introduced which results in the production of the novel adhesive layer-bearing closure heretofore described. Prior to engagement of the mold part 11 with the plastic sheet S, the annular surface of such mold part, which defines the closure surface on which the adhesive layer is desired in the finished closure, is encased, wrapped, or coated with a layer of adhesive-forming material A. This material may be applied in the form of an emulsion coating which may be readily and automatically brushed or rolled onto the surface of annular mold rim 11a, or the adhesive-forming material may be formed as a thin band of film and wrapped upon the mold surface. In any event, prior to the thermoforming of the closure, an annular portion of the thermoforming mold has applied thereto a thin layer of the adhesive-forming material A. Thus, when the thermoforming operation is performed in the manner as heretofore described, the adhesive-forming layer A will be transferred to those portions of the plastic sheet contacting the layer A and, hence, an annular adhesive-forming layer will be incorporated in the finished closure at a desired location.

Also, if desired, a barrier or reinforcing disc O may be laid on the disc portion 11e of the mold 11 prior to initiating the thermoforming steps and such disc will be incorporated in the finished closure, as illustrated in FIG. 5. Such disc O (FIG. 10) preferably comprises a laminate of aluminum foil O1, and a layer O2 of an adhesive-forming material having properties similar to the material utilized in the adhesive-forming layer A.

From the aforedescribed process, it will be apparent to those skilled in the art that many different materials may be employed for the fabrication of the closure and for the adhesive-forming layer A. For example, if it is desired to form the closure from any conventional polyolefin, such as low density polyethylene, then the thermoplastic material of the adhesive- forming layer A preferably is a modified polyethylene having a lower melting point than the material utilized by the closure. A suitable modified polyethylene is a copolymer of ethylene and acrylic acid, the resulting polymer having polar carboxyl groups dangling from the main molecular chain.

Suitable carboxyl-containing polyethylene polymers include those sold by Union Carbide Corporation under their resin designation Nos. DXQD–2888 and DXQD–2889 and those supplied by Dow Chemical Company under their designation PZ–4333.9.

An emulsion can be used to apply the adhesive-forming thermoplastic material layer to the thermoforming mold, the emulsion being heat activated to provide an adhesive material. Such a suitable emulsion is an ammonia-soluble copolymer of ethylene and acrylic acid offered by Union Carbide Corporation under their designation Nos. OC–3160 and OC–3222.

Other suitable adhesive-forming thermoplastic materials are alkali-metal containing ionic copolymers that are the reaction product of generally about 80 to 99 mole percent of ethylene and about 1 to 20 mole percent of an unsaturated monocarboxylic acid such as acrylic acid or methacrylic acid in which at least about 10% of the carboxyl groups are neutralized with an alkali metal ion that is preferably sodium. It is preferred that the ionic copolymer contain about 1 to 10 and, more preferably, about 4 mole percent of the unsaturated carboxylic acid and it is preferred that about 35–40% of the carboxyl groups be neutralized.

As previously indicated, the adhesive-forming material can be a copolymer of ethylene and another ethylenically unsaturated monomer such as vinyl acetate, ethyl acrylate, isobutyl acrylate, and acrylic acid.

A series of low density polyethylene closures was made, the melt index of the polyethylene being about 0.75 and the polyethylene sheet being preheated for about 60 seconds prior to vacuum forming. During the closure forming operation in accordance with the present invention, an adhesive liner material was bonded to the closure. The adhesive liner material and comments thereon are set forth below:

| Adhesive thermoplastic | Comments |
| --- | --- |
| 1. Ethylene/acrylic acid copolymer film. | Heat reactivated adhesive liner. |
| 2. Ethylene interpolymer of methacrylic acid and sodium methacrylate film. | Heat reactivated adhesive liner. Bond fair—least effective in series. |
| 3. Ethylene/vinyl acetate copolymer film. | Heat reactivated adhesive liner. |
| 4. Ethylene/acrylic acid polymer. | Used as part of a copolymer/aluminum foil sandwich—foil effective as a barrier. |

Copolymers of ethylene and isobutyl acrylate such as Dow 1375 (Dow Chemical Company) and copolymers of ethyl and vinyl acetate such as UE–633 (U.S. Industrial Chemicals Corp.) were also used with the polyethylene closure material and satisfactory closures made by applying the adhesive liner to the closure during the formation thereof.

As previously indicated, the thermoplastic material of the adhesive-forming layer should have a lower melting temperature than the material of the plastic sheet S and, furthermore, the material of the adhesive-forming layer should be meltable at the temperatures to which the sheet S is heated during the closure forming operation. This insures that the adhesive-forming layer A will adhere to the thermoformed closure during the thermoforming operations and for this reason, the portions 11a of the thermoforming mold upon which the adhesive-forming layer A is initially applied should be provided with sufficient cooling to insure that the material will not stick to the mold surface.

In the event that it is desired to utilize a pressure-sensitive adhesive material as the layer A, then it is essential that such material not be substantially activated by the relatively low pressures encountered in the thermoforming operation. I have found that these materials will transfer from the thermoforming mold to the thermoformed closure and may subsequently be activated to function as an effective adhesive under substantially higher pressure which is applied to the closure when the closure is applied to the rim of the desired container.

A suitable pressure-sensitive polymer is one that becomes activated at about 100° C. such as polyvinyl acetate. The adhesive-forming, pressure-sensitive polymer may be applied to the mold with a release coating such as one of polytetrafluoroethylene or the mold can be lined with such a coating if it is not desired to cool the mold sufficiently so that the adhesive-forming polymer will not stick to the mold.

Other modifications and embodiments of this invention will be immediately apparent to those skilled in the art, and it is intended that the scope of this invention shall be determined solely by the appended claims.

I claim:

1. The method of forming a closure from a first thermoplastic material comprising the steps of:

(a) positioning a heated sheet of said thermoplastic material in juxtaposition to a forming mold, said mold being constructed and arranged to define the desired internal contour of the closure and having at least one generally annular molding surface;

(b) encasing said molding surface with a thin layer of a second thermoplastic material having a lower melt temperature than said first material, said second adhesive-forming thermoplastic material being convertible into an adhesive for said first thermoplastic material by the application of heat and pressure;

(c) applying said sheet to the molding surfaces of said mold;

(d) thermoforming the sheet to provide a formed closure having the layer of said second thermoplastic material adhered to the formed closure; and (e) separating the formed closure from the remainder of said sheet.

2. A method as defined in claim 1 in which the first thermoplastic material is a polyolefin.

3. A method as defined in claim 1 in which the first thermoplastic material is polyethylene.

4. A method as defined in claim 1 in which the second thermoplastic material has carboxyl groups depending from its main molecular chain and is from the group consisting of:

(1) a copolymer of ethylene and an ethylenically unsaturated monomer;

(2) an alkali-metal containing ionic copolymer that is the reaction product of ethylene and an unsaturated monocarboxylic acid, some of the carboxyl groups of the copolymer being neutralized with an alkali metal; and (3) polyvinyl acetate.

5. A method as defined in claim 3 in which the second thermoplastic material has carboxyl groups depending from its main molecular chain and is from the group consisting of:

(1) a copolymer of ethylene and an ethylenically unsaturated monomer;

(2) an alkali-metal containing ionic copolymer that is the reaction product of ethylene and an unsaturated monocarboxylic acid, some of the carboxyl groups of the copolymer being neutralized with an alkali metal; and (3) polyvinyl acetate.

6. A method as defined in claim 3 in which the second thermoplastic material is a copolymer of ethylene and an ethylenically unsaturated monomer.

7. A method as defined in claim 3 in which the second thermoplastic material is an alkali-metal containing ionic copolymer that is the reaction puroduct of ethylene and an unsaturated monocarboxylic acid, some of the carboxyl groups of the copolymer being neutralized with an alkali metal.

8. A method as defined in claim 3 in which the second thermoplastic material is a copolymer of ethylene and acrylic acid.

9. A method as defined in claim 3 in which the second thermoplastic material is a copolymer of ethylene and ethyl acrylate.

10. The method of claim 1 wherein the second thermoplastic material is applied to the mold surface as an emulsion coating.

11. The method of claim 1 wherein the second thermoplastic material is applied to the mold surface as a band of solid film stock.

12. A thermoplastic closure formed according to the method of claim 1.

13. A method of forming a closure from a sheet of a first thermoplastic that is polyethylene, the method comprising the steps of:

(a) heating the sheet of polyethylene;

(b) placing the heated sheet in juxtaposition to a forming mold that is so constructed and arranged as to define the desired internal contour of the closure and having at least one generally annular molded surface;

(c) encasing the mold surface with a thin layer of an adhesive forming thermoplastic polymer having carboxyl groups depending from its main molecular chain, the adhesive forming polymer having a lower melt temperature than the polyethylene and being convertible into an adhesive for said polyethylene by the application of heat and pressure;

(d) applying the sheet of polyethylene to the molding surfaces of the mold; and (e) thermoforming the polyethylene into a closure having an annular layer of the adhesive forming polymer material bonded thereto during the thermoforming thereof.

References Cited

UNITED STATES PATENTS

| 2,736,065 | 2/1956 | Wilcox | 156—212X |
| 3,462,331 | 8/1969 | Simons | 264—268X |
| 3,493,453 | 2/1970 | Ceresa | 156—212X |
| 3,315,872 | 4/1967 | Carbone | 229—43 |
| 3,447,734 | 6/1969 | Wilcox | 229—43 |
| 2,634,012 | 4/1953 | Copeman | 161—42X |
| 3,402,874 | 9/1968 | Sternau | 229—43 |

PHILIP DIER, Primary Examiner

U.S. Cl. X.R.

161—252; 156—69, 212, 540, 232; 229—43; 215—38; 264—265, 268